United States Patent [19]

Dean et al.

[11] Patent Number: 5,334,914

[45] Date of Patent: Aug. 2, 1994

[54] VEHICLE INSTRUMENT PANEL LAMPS, PULSE WIDTH DIMMER SYSTEM THEREFOR

[75] Inventors: Patrick D. Dean, Armada; Abbas T. Sabbah, Sterling Heights, both of Mich.

[73] Assignee: Chrysler Corporation, Highland Park, Mich.

[21] Appl. No.: 855,975

[22] Filed: Mar. 23, 1992

[51] Int. Cl.[5] ............................................. H05B 37/00
[52] U.S. Cl. ...................................... 315/291; 315/77; 315/83
[58] Field of Search .................. 315/77, 82, 83, 291, 315/307, 294, 76

[56] References Cited

U.S. PATENT DOCUMENTS 5,001,398  3/1991  Dunn ..................................... 315/77
5,113,120  5/1992  Scott et al. ............................ 315/77

Primary Examiner—Robert J. Pascal
Assistant Examiner—Tan Dinh
Attorney, Agent, or Firm—Wendell K. Fredericks

[57] ABSTRACT

A pulse width dimming system responsive to low frequency pulse width modulated signals of various duty cycles employs a single charging capacitor in a charge pump circuit to develop voltage signals for controlling current through a field effect transistor used to control dimming of the intensity of lamps in a vehicle instrument panel.

1 Claim, 3 Drawing Sheets

VEHICLE INSTRUMENT PANEL LAMPS, PULSE WIDTH DIMMER SYSTEM THEREFOR

BACKGROUND OF THE INVENTION

1. Field of the Invention

This invention relates to a pulse width modulated dimming system in a vehicle, more particularly to a dimming system for manually controlling the dimming of the intensity of the light from the panel lamps with respect to full intensity using a pulse width modulated control signal.

2. Prior Art

In controlling the amount of current routed to the lamps in the instrument panel, a field effect transistor (FET) is usually employed. Some sort of charge pump/voltage doubler network is used to develop power for driving the FET. To develop the power a rather high frequency pulse width modulated (PWM) signal is commonly used to stimulate the charging of the capacitors in the charge pump circuit. However, in using the high frequency PWM signal undesirable system noise develops and usually more than one capacitor and often many other components such a schmitt triggers must be used to fulfill the charge pump operation.

Realizing the various problems associated with high speed switching of signals in various high reactance media and keeping cost of components in vehicles at a minimum without sacrificing performance, a search was initiate for various means to provide control over PWM dimming of lamps. This search resulted in the improved PWM dimming system of the present invention.

SUMMARY OF THE INVENTION

The invention discloses a microcontroller that provides a low frequency PWM signal used in conjunction with a discrete component circuit containing a single charging capacitor in a charge pump circuit for developing a suitable high voltage signal for controlling the current to a plurality of panel lamps connected to the output terminal of a FET.

The discrete component circuit also contains failsafe provisions for inhibiting the circuit in the event of the occurrence of a faulty PWM signal or an MCU reset signal.

IN THE DRAWINGS

DETAILED DESCRIPTION OF A PREFERRED EMBODIMENT

Figure 1:
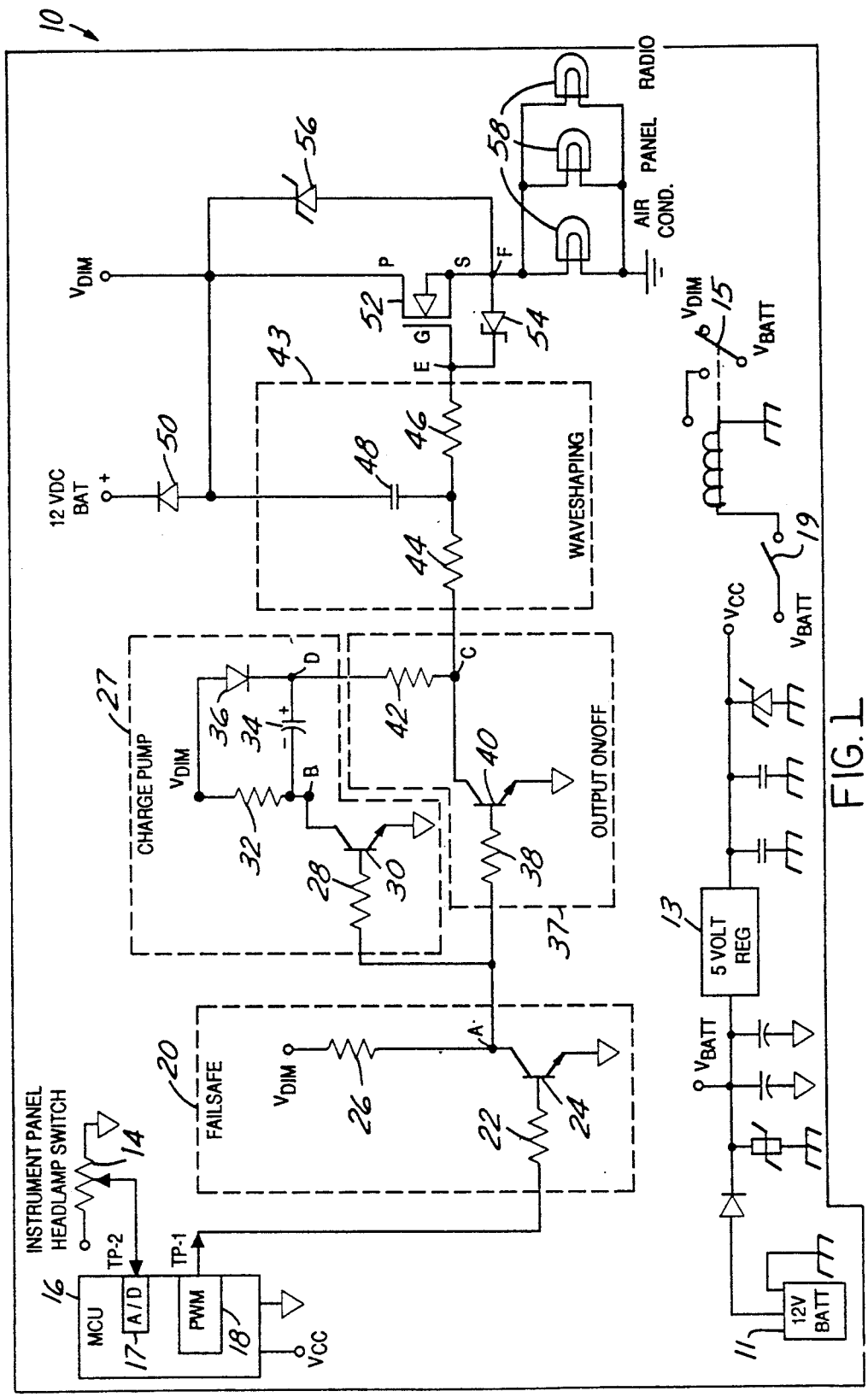
FIG. 1 depicts in a partial pictorial, partial schematic diagram of the pulse width dimming system of the present invention.
Figure 1A:
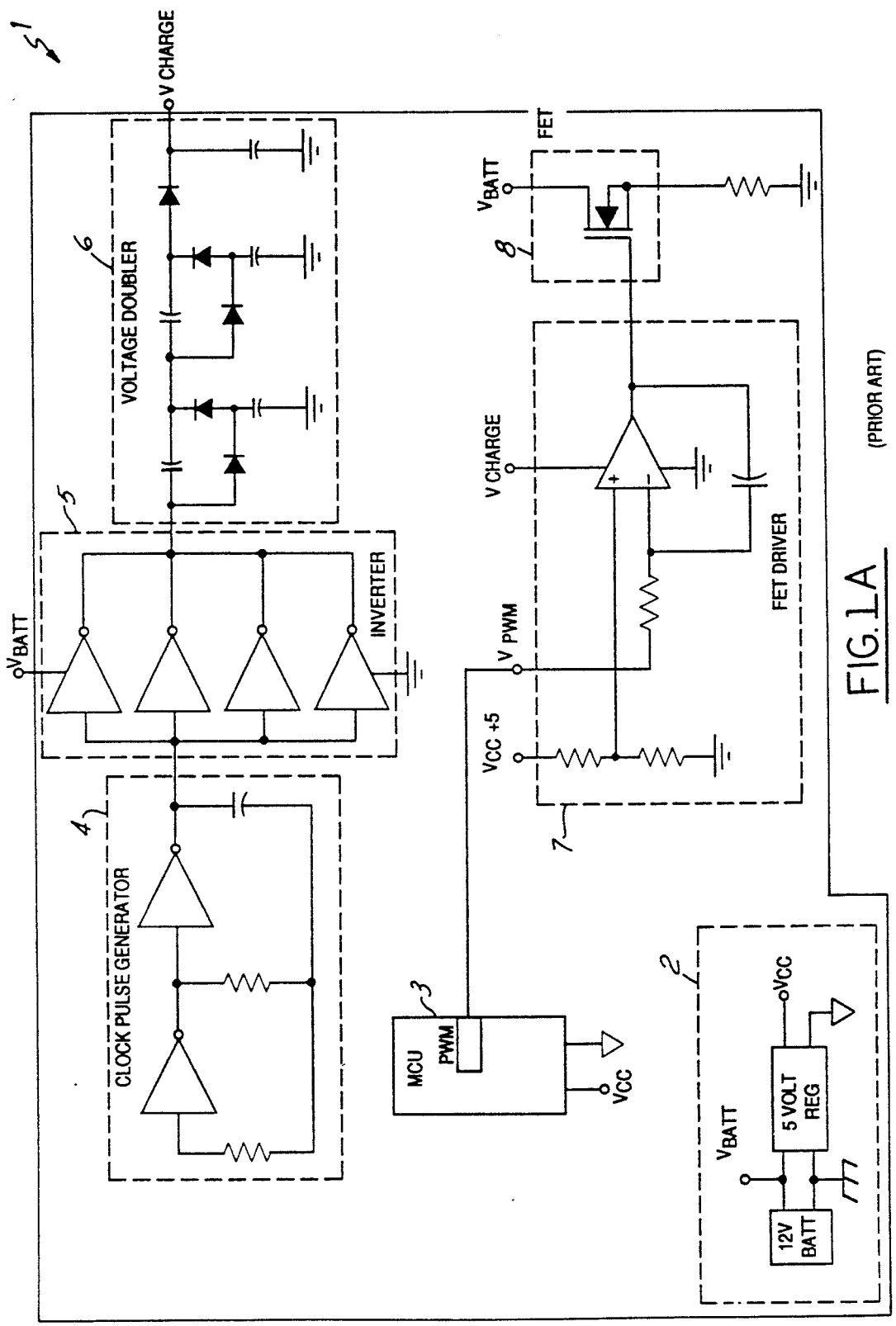
FIG. 1A illustrates in a partial pictorial, partial schematic diagram of a prior art pulse width dimming system.

Referring now to FIG. 1A, this figure depicts a prior art pulse width modulated vehicle lamp dimmer system 1. System 1 includes a 12 power supply source 2, a microcontroller (MCU) 3 that includes an A/D converter circuit with a potentiometer 3A as an input device and a pulse width modulation (PWM) circuit of which the potentiometer settings affect the PWM, a clock pulse generator 4, a gang of conventional inverters 5, a voltage doubler circuit 6, a field effect transistor (FET) driver circuit 7, a FET 8 and instrument panel lamps 9—9.

The power supply source 2 provides 12 VDC battery power (VBATT) and a regulated 5 VDC system supply voltage (VCC). Clock pulse generator 4 produces pulses at a rate of $1/(1.4 RC)$ with components selected to produce pulses at about 45 kHz. The gang inverters 5, connected to the output of generator 4, sharpens up the pulses from generator 4 and produces approximately a 12 VDC square wave pulses with about a 50% duty cycle.

This square wave signal routes to the voltage charger circuit 6 which provides about a 24 VDC (V charge) signal used to power the FET driver circuit 7. The FET driver circuit 7 receives the VCC input voltage, PWM signals from MCU 3 and the V charge signal from voltage doubler circuit 6 and produces at an output terminal 24 VDC pulse signals of a duration selected by the setting of potentiometer 3A to an N-channel FET 8. The output of FET 8 controls the intensity of the lamps 9—9.

Prior art circuit 1A provides suitable variations of output voltage signals to lamps 9—9 to permit adjusting the illumination and dimming. However, such a circuit operates at a fairly high frequency rate that in a vehicle environment generates more system noise than desirable. In an effort to find a less noisy vehicle lamp dimmer system a search was initiated to find new approaches to provide PWM controlled lamp dimming at a much lower frequency. That search ended with the accomplishment of an improved PWM vehicle lamp dimming system of the present invention.

A PREFERRED EMBODIMENT OF A VEHICLE LAMP DIMMING SYSTEM

FIG. 1 illustrates in a partial pictorial, partial schematic diagram, a vehicle Lamp Intensity Control System 10 that includes a pulse width dimming (PWD) module 12. This system permits dimming and brightening the panel lamps 58—58 within the instrument panel and console of the vehicle.

SYSTEM POWER SOURCE

Battery power (VBATT) for the system emanates from a 12VDC vehicle battery 11. A power relay 15 connected across battery 11 by instrument panel light switch 19 provides dimming voltage (VDIM) for powering PWD module 12. Also, battery 11 supplies power to a conventional 5 VDC regulator 13 used to provide power to MCU 16.

MCU CIRCUITS

An instrument panel dimmer control potentiometer 14, connected to TP-2 of MCU 16, adjustable between OFF or ground and fully ON, allows an operator to adjust a control signal to an analog to digital (A/D) converter 17 within microcontroller unit (MCU) 16, located in the instrument panel. The digital signal from the A/D converter 17 regulates the duration of the 5 VDC pulses from PWM circuit 18 in MCU 16. Illustratively, the duty cycle of a 122 Hz PWM signal can vary from 10%-99% This manually varied duration PWM signal routes to an input circuit of the PWD module 12.

PULSE WIDTH DIMMING MODULE CIRCUITS
FAILSAFE CIRCUIT

This PWM signal from MCU 16, having an amplitude of, e.g., 5 VDC goes to a failsafe circuit 20 of PWD module 12. The PWM signal enters module 12 through one end of a resistor 22, connected to TP-1 of MCU 16 and travels to the base of a NPN transistor switch 24. Providing the failsafe feature, transistor 24 cuts off if PWM 18 ceases to function or MCU 16 goes into reset mode. Cutting off transistor 24 inhibits operation of the output ON/OFF circuit 37 as well as the succeeding circuits. Otherwise, transistor 24 operates in a switching mode providing 12 VDC pulses at the collector output terminal (A) of an opposite polarity from that at TP-1 of MCU 16.

CHARGE PUMP AND OUTPUT ON/OFF CIRCUIT

The pulse signal at terminal A routes along two paths. One path goes to the base of transistor 30 of the charge pump circuit 27 via base resistor 28 and the other path goes to the base of transistor 40 of the output ON/OFF circuit 37 via base resistor 38. Pulse signals at collector terminal (B) of Transistor 30 switch between 0 and 12 VDC and appear opposite in polarity to the signal at terminal A.

Pulse signals at terminal (C) of transistor 40 switch between 0 and 20.2 VDC in response to the same opposite polarity signal at terminal A and the potential difference developed at terminal D due to charging and discharging of capacitor 34.

Initially, with transistor 30 switched ON, the positive terminal of capacitor 34 charges to the potential of VDIM or 12 VDC via diode 36. When transistor 30 switches OFF, the negative terminal of capacitor 34 switches directly to 12 VDC also. But since the potential difference across capacitors do not instantaneously change, the voltage at the positive terminal of capacitor 34 switches to 24 VDC with respect to the 12 VDC at the negative terminal maintaining the potential difference across capacitor 34 at 12 VDC.

With diode 36 reversed biased by the amplitude of the pulse voltage at terminal D, the potential difference at terminal D switches between 12 and 24 VDC.

The collector voltage at terminal C of transistor 40 tend to follow the alternations but producing amplitudes around 20.2 VDC. Transistor 40 acts as a buffer to the incoming PWM signal from MCU 16 and a second failsafe electronic switch in the event a fault in the PWM signal or a reset mode of the MCU occurs.

WAVE SHAPING CIRCUIT

Capacitor 48 and resistors 44 and 46 form an integrator circuit of waveshaping circuit 43 for stabilizing and shaping the pulse signal at terminal C. The pulse signal at terminal C provides the input voltage signal to the integrator and the voltage across capacitor 48 provides the output signal. Resistor 42 of the output ON/OFF circuit contributes to the rise time of the integrator circuit. The output voltage at terminal E rises and falls between 0 and about 20.2 VDC in response to the pulse signal at terminal C in accordance with the exponential equations associated with conventional integrator circuits. A conventional reversed bias diode 50 provide spike protection to circuit 43.

TEMPERATURE PROTECTED N-CHANNEL MOSFET

The voltage at terminal E apply to the gate terminal of field effect transistor (FET) 52, an enhancement mode temperature protected type unit. While the shaped pulse signal at the gate or terminal E of FET 52 varies between 0 and 20.2 VDC in response to the pulse signal routed through resistor 46, illustratively, an 8.2 volt zener diode 54 limits the gate to source terminal voltage to 8.2 VDC V source of FET 52 or approximately 20.2 VDC.

As the voltage at terminal E increases, FET 52 switches ON and applies VBATT at terminal F to illumination lamps 58—58. As terminal E voltage decreases, the FET 52 switches OFF and lamps 58—58 are extinguished. The time that VBATT remains "ON" duty cycle during the 122 HZ signal determines the intensity of lamps 58—58.

TIMING DIAGRAMS

Figure 2:
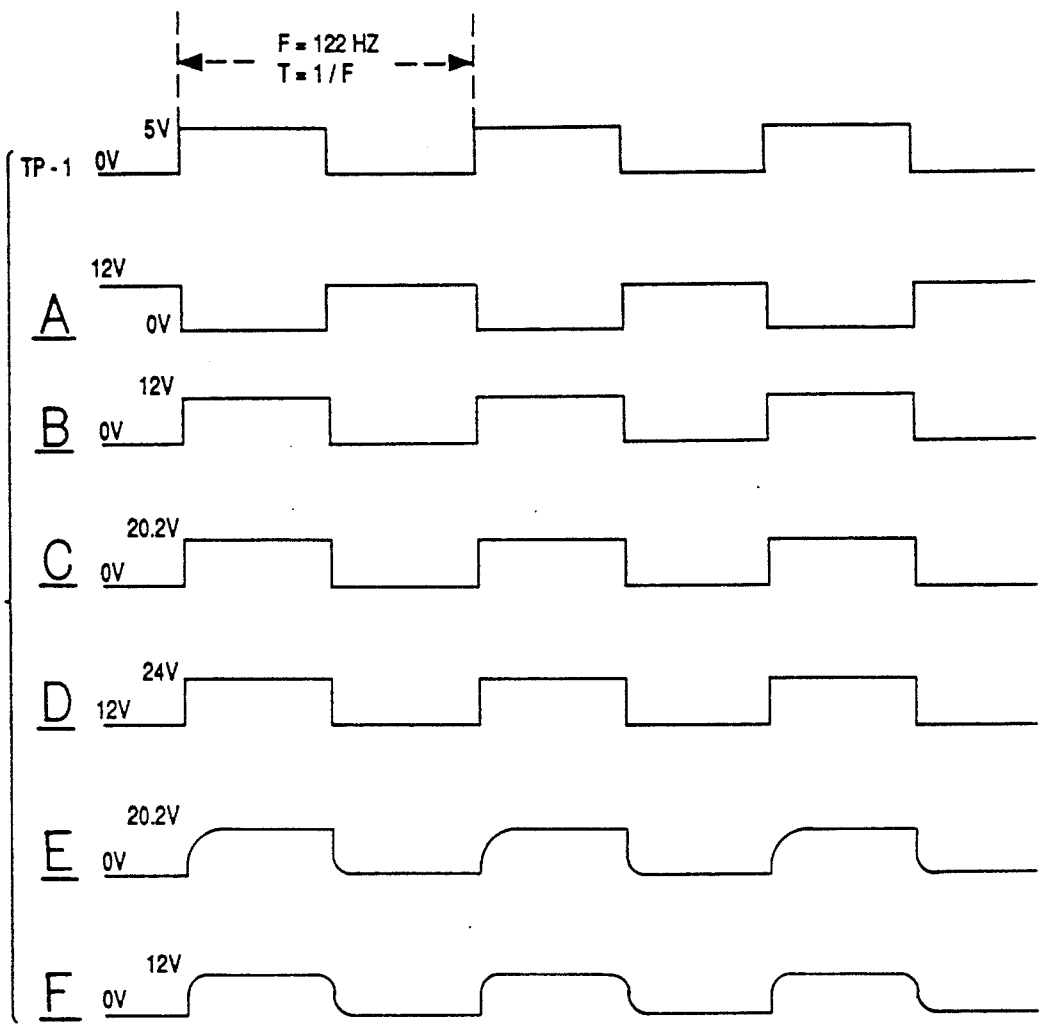
FIG. 2 (A-F) illustrates waveforms of the pulse signals at designated terminals within the pulse width dimming system depicted in FIG. 1.

To further explain the operation of system 10, refer now to the timing diagrams of FIGS. 2.

FIG. 2 (A-F) depicts voltage waveforms resulting from a 50% duty cycle PWM signal at TP-1 of MCU 16. FIG. 2-A depicts the inverted pulse signal at terminal A of the failsafe circuit 20; FIGS. 2-(B and D) show the voltage across capacitor 34 at terminals B and D respectively of the charge pump circuit 27; FIG. C illustrates the waveform at terminal C of the output ON/OFF circuit 37; and FIGS. E and F depicts the voltage waveform across the gate and source of FET 52.

When an operator adjust the PWM signal at TP-1 for a 50% duty cycle, the lamps 58—58 will dim at $\approx \frac{1}{2}$ maximum intensity; for 25% duty cycle, will dim to $\approx \frac{1}{4}$ maximum intensity; and for 75% duty cycle will dim to $\approx \frac{3}{4}$ maximum intensity.

Microcontroller 16 may be a Motorola unit such as one of the 68HC05 families of controllers; FET 52 may be a temperature protected N-channel MOSFET, MODEL BTS 130 from the Siemens Corporation; the transistors may be conventional NPN 2N3904's and the lamps may rate as a 5 amp load.

I claim:

1. A pulse width modulation (PWM) lamp dimming system in a vehicle instrument panel for furnishing a lamp illumination mode of operation with selectable variable dimming states with respect to full illumination of a plurality of lamps in the instrument panel, the dimming system being energized from a source voltage of electrical potential difference coupled to (1) a voltage regulator device for supplying a source of regulated power of a chosen amplitude and to (2) an instrument panel lamp switch and relay for applying the source voltage to the dimming system when desirous of manual control of illumination of the lamps of the instrument panel, said dimming system comprising:

(a) an instrument panel potentiometer mounted on said panel for providing a manually controlled signal referenced to said source of regulated power which can vary between fully OFF to a maximum signal level for adjusting the amount of dimming of said instrument panel lamps;

(b) a microcontroller unit (MCU) including an analog to digital converter (A/D) circuit and a pulse width modulation (PWM) circuit, receiving regulated power from said voltage regulator and having an input terminal port of said A/D converter that receives control signals from said potentiometer used to produce an internal control signal for adjusting the pulse width and duty cycle of an output pulse signal of a chosen frequency from said PWM circuit;

(c) a pulse width dimming (PWD) module circuit connected to receive the PWM signals from said microcontroller for developing a failsafe, waved shaped, charged pump type modified PWM signal in response to the duty cycle of the incoming PWM signal; the failsafe circuit having an electronic switch coupled to receive the PWM signal from said MCU for providing passing the PWM signal during normal operation but inhibiting the other circuits of said PWD module of the PWM signal ceases or said MCU goes in a reset mode; said PWD module also including an output ON/OFF circuit having a second electronic switch coupled to the output of said failsafe circuit for buffering the PWM signal entering said failsafe circuit, said second electronic switch also forming another failsafe circuit for switching OFF the input PWM signal if a signal failure occurs in said MCU; said PWD module also includes a waveshaping circuit for accepting the output pulse signal from said charge pump circuit and producing at an output terminal an integrated pulse signal in response to the signal from said charge pump, the duty cycle of the integrated pulse signal being in proportion to the control signal from the potentiometer control signal routed to the A/D converter of said MCU; and (d) an n-channel field effect transistor (FET) coupled between said PWD module and said plurality of instrument panel lamps for providing various levels of current to said lamps in response to the duty cycle of the PWM signal, said FET having a first zener diode connected across the source and drain terminals of said FET for reducing the effects of supply voltage transient currents passing through said FET.

* * * * *